(12) United States Patent
Sandbach

(10) Patent No.: US 6,504,531 B1
(45) Date of Patent: Jan. 7, 2003

(54) DETECTING MECHANICAL INTERACTIONS

(75) Inventor: David L. Sandbach, London (GB)

(73) Assignee: Eleksen Limited, Hertfordshire (GB)

( * ) Notice: Subject to any disclaimer, the term of this patent is extended or adjusted under 35 U.S.C. 154(b) by 0 days.

(21) Appl. No.: 09/743,964

(22) PCT Filed: May 4, 2000

(86) PCT No.: PCT/GB00/01552
§ 371 (c)(1),
(2), (4) Date: Jan. 18, 2001

(87) PCT Pub. No.: WO00/72240
PCT Pub. Date: Nov. 30, 2000

Related U.S. Application Data

(63) Continuation-in-part of application No. 09/315,139, filed on May 20, 1999.

(51) Int. Cl.[7] .................................................. G09G 5/00
(52) U.S. Cl. ...................................... 345/173; 178/18.05
(58) Field of Search ................................ 345/173, 174, 345/178; 178/18.01, 18.03, 18.05–18.08; 338/99, 208

(56) References Cited

U.S. PATENT DOCUMENTS

| | | | |
|---|---|---|---|
| 3,911,215 A | 10/1975 | Hurst et al | |
| 4,220,815 A | 9/1980 | Gibson et al. | |
| 4,503,286 A | * 3/1985 | Kubo et al. | .................... 178/18 |
| 4,659,873 A | 4/1987 | Gibson | |
| 4,687,885 A | 8/1987 | Talmage, Jr. et al. | |
| 4,707,845 A | 11/1987 | Krein et al. | |
| 4,798,919 A | 1/1989 | Miessler et al. | |
| 5,159,159 A | 10/1992 | Asher | |
| 5,262,778 A | 11/1993 | Saunders | |
| 5,453,941 A | 9/1995 | Yoshikawa | |
| 5,686,705 A | 11/1997 | Conroy et al. | |
| 5,790,105 A | 8/1998 | Yoshikawa | |
| 5,815,139 A | 9/1998 | Yoshikawa et al. | |
| 5,852,260 A | 12/1998 | Yoshikawa | |
| 6,333,736 B1 | * 12/2001 | Sandbach | .................... 345/178 |
| 6,369,804 B1 | * 4/2002 | Sandbach | .................... 345/173 |

FOREIGN PATENT DOCUMENTS

| | | |
|---|---|---|
| EP | 0261770 A2 | 3/1988 |
| EP | 0 989 509 | 3/2000 |
| JP | 61 231626 | 10/1986 |
| JP | 09 297650 | 11/1997 |

* cited by examiner

Primary Examiner—Regina Liang
(74) Attorney, Agent, or Firm—Nixon & Vanderhye P.C.

(57) ABSTRACT

A fabric-made position detector has a first fabric electrically conducting layer and a second fabric electrically conducting layer. The first electrically conducting layer has a first electrical contact and a second electrical contact and a second electrically conducting layer has a third electrically conducting contact and a fourth electrically conducting contact. Potential is applied across the first contact and the third contact to produce a first current and a potential is then applied across the second contact and the fourth contact to produce a second current. The first current is measured to produce a first current value and the second current is measured to produce a second current value. The first value and the second value are processed in combination to produce a property value indicating a property of the mechanical interaction.

20 Claims, 16 Drawing Sheets

DETECTING MECHANICAL INTERACTIONS

REFERENCE TO RELATED APPLICATIONS

The present invention was made by Mr David Lee Sandbach who is resident in the United Kingdom. A permit to file a first application outside the United Kingdom under section 23(1) of the patents act 1977 was obtained on May 19, 1999. The present application claims priority from U.S. patent application Ser. No. 09/315,139 filed on May 20, 1999. With respect to the United States designation, the present application is filed as a continuation in part.

FIELD OF THE INVENTION

The present invention relates to detecting a mechanical interaction with respect to a position detecting device, wherein the position detecting device is configured to detect the position of a mechanical interaction by measuring electrical potential applied across electrically conducting layers.

BACKGROUND OF THE INVENTION

A position sensor for detecting the position of a mechanical interaction is described in European patent publication 0 989 509, equivalent to U.S. patent application Ser. No. 09/298,172, Korean patent application number 99-40363, Japanese patent application number 11-2,513 and Australian patent application 48770/99, all assigned to the present, assignee. The position detector is configured to determine the position of a mechanical interaction. In addition, the detector is also configured to measure the extent of the mechanical interaction in which the representation of the extent of a mechanical interaction is usually made up of components representing the force of the mechanical interaction and the area, over which the mechanical interaction takes effect.

A problem with the known position detector is that the extent measurements are extremely accurate at positions away from edge of the detector. However, as positions approach the edges of the detector and particularly when positions approach corners of the detector the accuracy of the extent of the mechanical interaction measurements, becomes relatively inaccurate.

BRIEF SUMMARY OF THE INVENTION

According to a first aspect of the present invention, there is provided a fabric-made position detector, having a first fabric electrically conducting layer; a second fabric electrically conducting layer, wherein said first electrically conducting layer has a first electrical contact and a second electrical contact and said second electrically conducting layer has a third electrically conducting contact and a fourth electrically conducting contact; potential applying means for applying potential across said first contact and said third contact to produce a first current and for applying a potential across said second contact and said fourth contact to produce a second current; current measuring means for measuring said first current to produce a first current value and for measuring said second current to produce a second current value; and processing means configured to produce a property value indicating a property of a mechanical interaction by processing said first current value in combination with said second current value.

According to a second aspect of the present invention, there is provided a fabric-made position detector, having a first fabric electrically conducting layer; a second fabric electrically conducting layer, wherein said first electrically conducting layer has a first electrical contact and a second electrical contact and said second electrically conducting layer has a third electrically conducting contact and a fourth electrically conducting contact; potential applying means for applying potential across said first contact and said third contact to produce a first current and for applying a potential across said second contact and said fourth contact to produce a second current; current measuring means for measuring said first current to produce a first current value and for measuring said second current to produce a second current value; and processing means configured to produce a property value indicating a property of a mechanical interaction by processing said first current value in combination with said second current value.

An advantage of said first aspect is that the accuracy of said property value is enhanced significantly by deriving a result from the combination of two measurements. Inaccuracies may still occur at edges of the device when using isotropic conducting layers.

In a preferred embodiment, the fabric-made position detector is configured such that said fabric electrically conducting layer and/or said second fabric electrically conducting layer have different conductivites in different directions. Preferably, layer conductivity of the first layer in a first direction connecting said first contact with said second contact is lower than the conductivity in a second direction perpendicular to said first direction.

The use of non-isotropic layers facilitates a more accurate analysis and modelling of layer resistivities. Consequently, in a preferred embodiment, the property value is determined by combing a reciprocal of said first current value with a reciprocal of said second current value.

According to a second aspect of the present invention, there is provided a method of detecting a mechanical interaction with respect to a position detecting device, wherein said position detecting device is configured to detect the position of the mechanical interaction by measuring electrical potentials applied across electrically conducting layers, characterised by the steps of measuring a first current when an electrically potential is applied between a first contact and a first conducting layer and third contact of a second conducting layer while disconnecting connections to a second contact of the first conducting layer and a fourth contact of said second conducting layer; measuring the second current when an electrical potential is applied between said second and said fourth contacts while disconnecting connections to said first and said third contacts; and processing said first current measurements in combination with said second current measurement to derive an output indicative of a characteristic of said mechanical interaction.

BEST MODE FOR CARRYING OUT THE INVENTION

Figure 1:
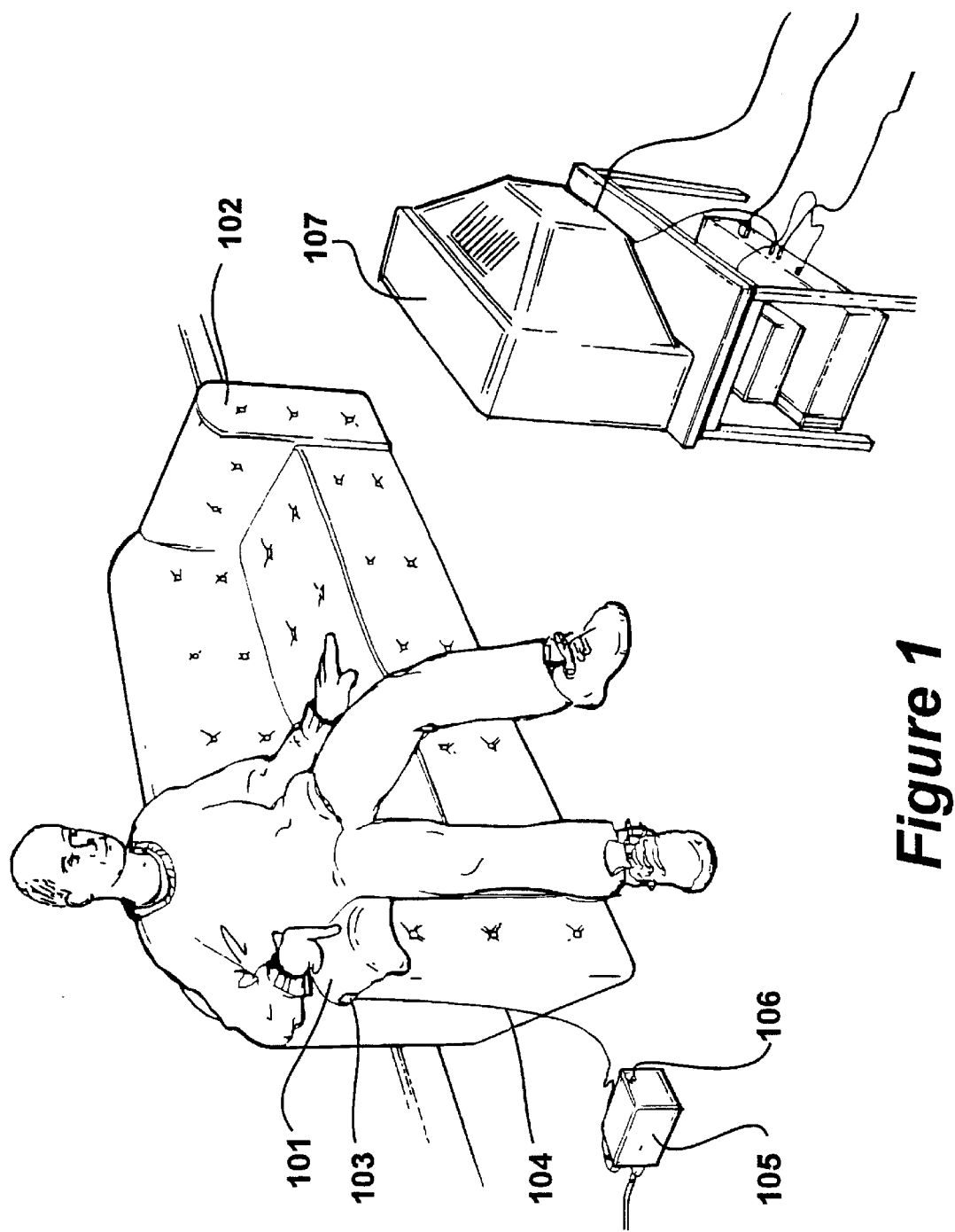
FIG. 1 shows a position sensor embodying the present invention.

A position sensor 101 embodying the present invention is shown in FIG. 1, fabricated from fabric layers of a material and configured to rest on a flat or curvilinear surface. The sensor responds to mechanical interactions and in the specific example shown in FIG. 1, these mechanical interactions take the form of manual pressure being applied by users in order to make selections.

In the example shown in FIG. 1, the sensor 101 provides a substitute for a television, video recorder or satellite television remote control. In preference to a solid object providing a series of buttons, the detector is substantially fabric and may adopt a shape defined by soft furnishing. In the example shown, the detector 101 is configured as a separate item but in an alternative configuration the detector could be included as part of a soft furnishing item, such as a chair or sofa 102.

The sensor 101 includes an interface circuit 103 arranged to respond to mechanical interactions and to provide co-ordinate and pressure data over an interface line 104 to a processing device 105. In response to mechanical interaction effected by a user, positional data is conveyed to processing device 105 that in turn transmits infra-red data via an infra-red transmitter 106 to audio-visual equipment, such as television 107. In an alternative embodiment, the interface circuit and the infra-red transmitter are miniaturised and included as part of the fabric detector itself.

Figure 2:
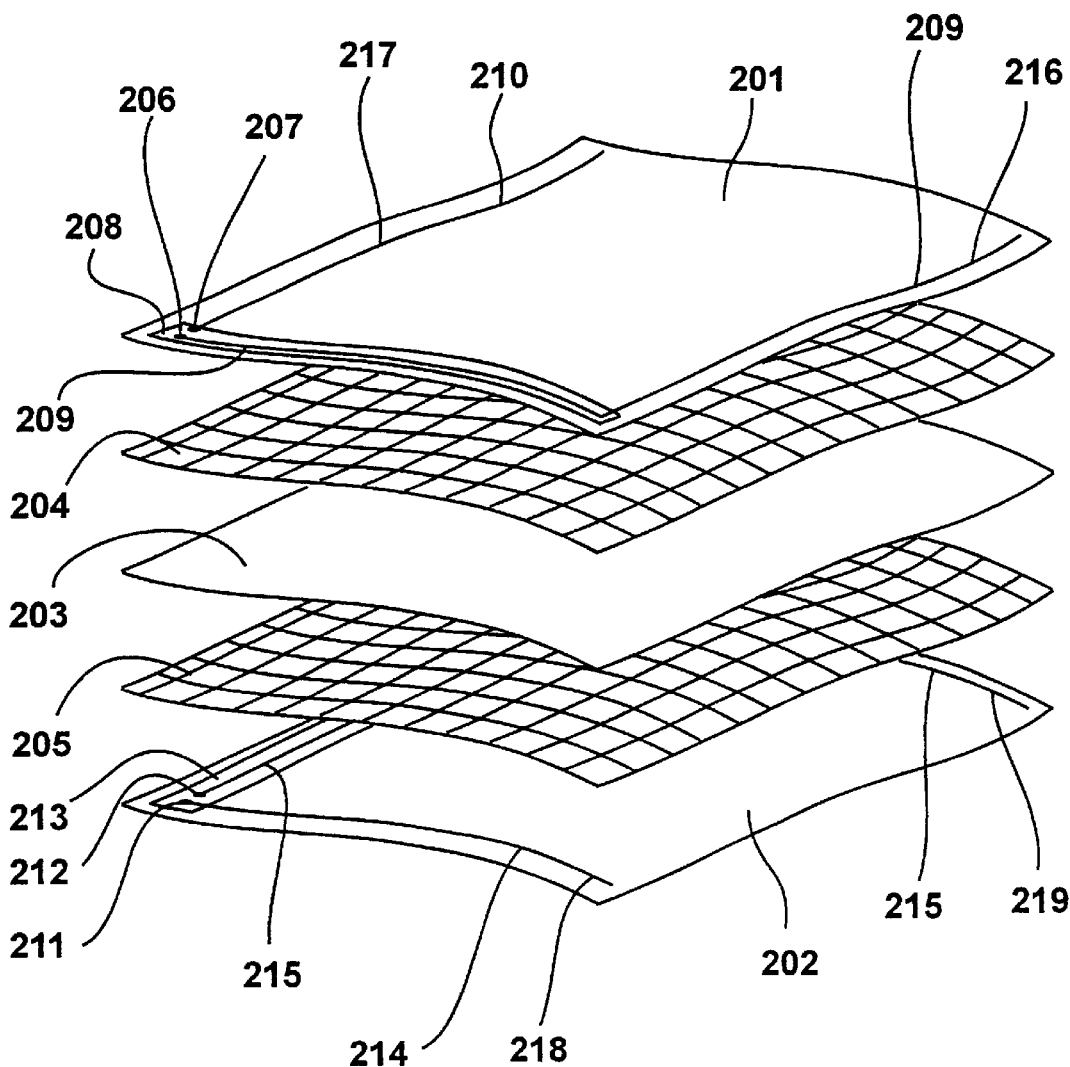
FIG. 2 details the sensor shown in FIG. 1.

An example of a sensor of the type shown in FIG. 1 is shown in exploded view in FIG. 2. The sensor comprises two woven outer fabric layers 201 and 202, separated by a central layer 203. The central layer 203 is a layer of knitted fabric which may be made from conductive fibre only. Such fibre may, for example be a carbon coated nylon fibre. However, preferably a yarn is used in the knit which is a mixture of insulating and conductive fibres.

The first insulating mesh layer 204 is located between the upper fabric layer 201 and the central layer 203 and a second insulating mesh layer 205 is located between the lower fabric layer 202 and the central layer 203. The insulating mesh layers 204 and 205 are made from polyester fabric of a warp knit construction. Fabric of this type is readily available and may be used in applications such as mosquito netting.

Electrically conductive fibres are used when weaving layer 201 and 202 such that layers 201 and 202 define two electrically conductive layers. Alternatively, layers 201 and 202 may be constructed from non-woven (felted) or knitted fabrics or as a composite structure. However, in each of these alternative applications, electrically conductive fibres are included in the production of the fabric, thereby providing electrically conductive layers.

Two electrical connectors 206 and 207 are located on a rectangular insulating stripe 208 that is positioned along one edge of fabric layer 201. The insulating stripe is produced by printing insulating ink on to the fabric. Alternatively, insulating adhesive tape could be used. The connectors 206 and 207 provide a means of connection from the interface circuit 203 to low resistance elements 209 and 210 respectively. Low resistance elements are fabricated from fabric coated with metals such as nickel or silver. Material of this type is readily available and is used for shielding equipment from electromagnetic interference. The low resistance elements are attached to the conductive fabric layer 201 and to the insulating stripe 208 by conductive adhesive, such as a pressure sensitive acrylic adhesive containing metalised particles. Consequently, portions 216 and 217 of the low resistance elements 209 and 210 make electrical contact with the conductive fibres of layer 201 along two of it's opposing edges.

The conducting adhesive ensures a bond is formed between the low resistance elements 209 and 210 and the conductive fibres. Due to this bond, the resistance between the conductive fibres and; the connection portions 216 and 217 remains unaffected by folding or flexing the layers 201. This is important as, otherwise, a dry joint would exist connecting 216 and 217 to 201 and a varying resistance at the connections would lead to unreliable and possibly unstable measurements when the sensor is operated.

Alternatively, the low resistance elements 209 and 210 are formed by attaching, for example by sewing, a low resistance fibre to the layer 201 and then printing a conductive adhesive or compound onto it and the layer 201. Alternatively, the lower resistance elements may be produced by printing an elastomeric material containing conductive particles onto the layer 201. All of the alternative methods described provide a suitable bond, forming a reliable electrical connection or wet joint.

The lower fabric layer 202 has a similar construction to the upper fabric layer 201, having connectors 211 and 212 located on insulating stripe 213. The connectors 211 and 212 provide a means for connecting interface circuit 103 with low resistance elements 214 and 215 respectively. The two layers 201 and 202 are rectangular and the construction of layer 202 is rotated 90 degrees from that of layer 201. Thus, contacting portions 216 and 217 contact the conductive fibres in layer 201 along two opposing edges and the low resistance elements 214 and 215 have contacting portions 218 and 219 that contact the conductive fibres in layer 202 along the alternate opposing edges.

Figure 3:
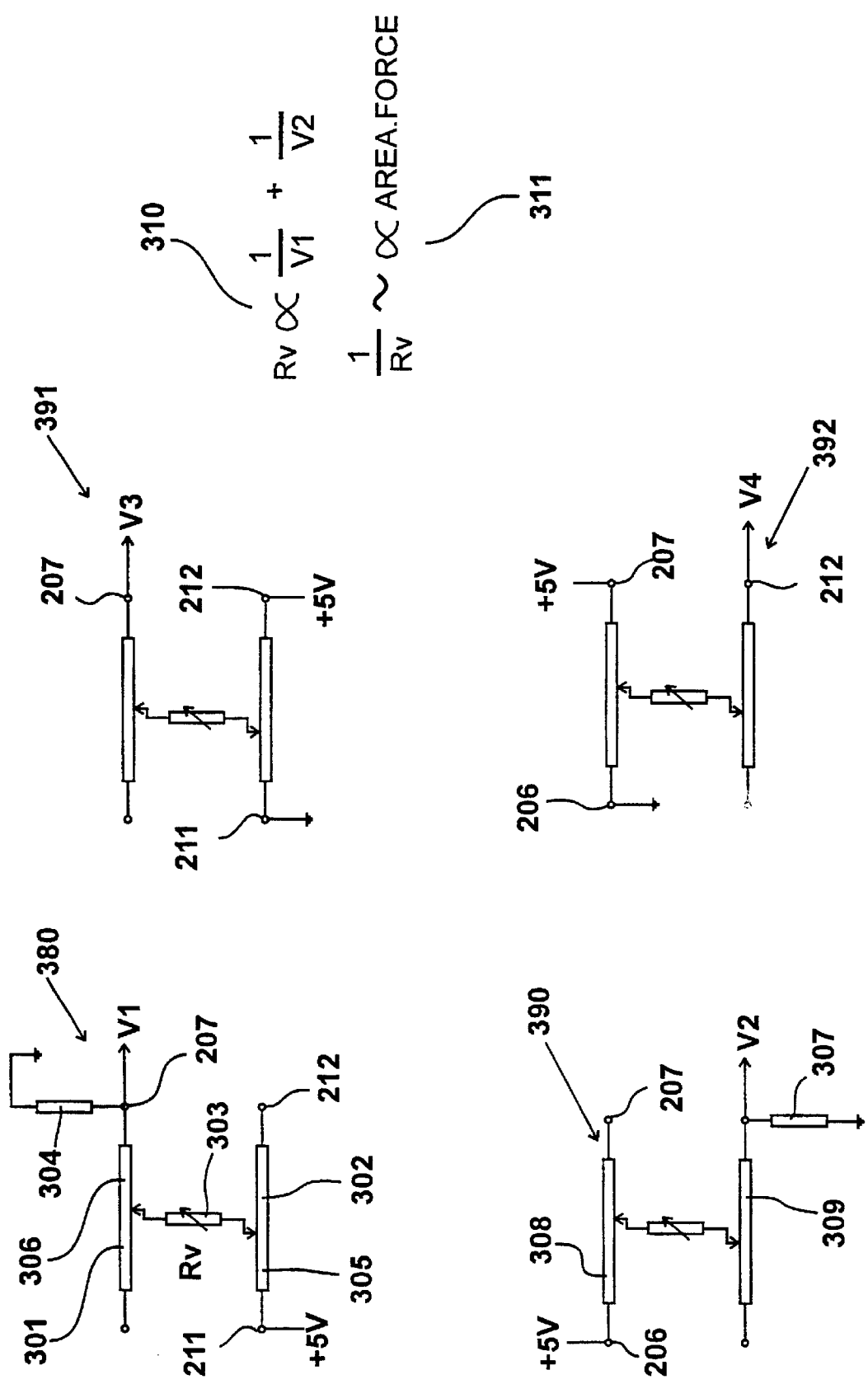
FIG. 3 illustrates upper and lower fabric layers of the sensor shown in FIG. 2.

A procedure for measuring the position and the extend of a force supplied to a position sensor consisting of fabric layers as described herein, is illustrated in FIG. 3. The outer conductive layers 201 and 202 are represented schematically by potentiometers 301 and 302 at 380 and the resistance of the conductive path between the outer layers at the location of a mechanical interaction is represented by variable resistor 303. A first measurement is shown in which 5 volts are applied to connector 211 while connector 212 remains disconnected. Connector 207 is connected to ground via a resistor 304 of known value. Thus, current flows from connector 211 through a first part of layer 202 indicated by first part 305 of potentiometer 302, through the conductive path indicated by variable resistor 303 having a resistance Rv, through a first part of layer 201, indicated by a first part 306 of potentiometer 301 and through the known resistor 304. The voltage V1 at connector 207 is measured and since this is equal to the voltage drop across resistor 304, voltage V1 is directly proportional to the current flowing from connector 211.

A second measurement is shown at 390 in which five volts are applied to connector 206, while connector 207 is disconnected. Connector 212 is connected to ground via a resistor 307 of known resistance. The voltage V2 dropped across resistor 307 is measured. This voltage V2 is directly proportional to the current flowing through a second part of layer 201 indicated by a second part 308 of potentiometer 301, through the conductive path indicated by variable resistor 303 having resistance Rv, through a second part of layer 202 indicated by a second part 309 of potentiometer 302 and through resistor 307.

The sum of the resistance of first part 306 and second part 308 of potentiometer 301 is approximately equal to the resistance between connectors 206 and 207 on layer 201 and is therefore substantially constant during the measurements, since they occur in rapid succession. Similarly, the sum of the resistance of the first part 305 and the second part 309 of potentiometer 302 is approximately equal to the resistance between connector 211 and connector 212 on layer 202 and is also substantially constant during the measurements. As a result, a relationship 310 exists between the resistance Rv of the conductive path between the outer layers and the measured voltages V1 and V2. That is to say, the resistance Rv between the outer layers is proportional to the sum of the reciprocal of voltages V1 and the reciprocal of voltages V2.

Useful results may be obtained by merely averaging these voltages but greater accuracy is obtained if account is taken of relationship 310 when designing operations to be executed within control hardware.

The resistance value Rv depends upon the area of the mechanical interaction and the pressure or force applied at the mechanical interaction, as illustrated by relationship 311. Thus, from the voltage measurements V1 and V2, it is possible to derive an indication of the area over which the force is applied or an indication of the area and the applied force that has been applied, dependent upon the type of sensor being used. Such an indication is substantially independent of the position of the mechanical interaction on the sensor.

A third measurement is shown at 391. Five volts are applied to connector 212 while connector 211 is grounded, thereby creating a potential gradient across layer 202. A voltage measurement is made at connector 207 using a high impedance device and so the voltage appearing on layer 202 at the position of the applied force is determined. This voltage, V3 is directly proportional to the distance of the centre of the applied force from connecting portion 218 and indicates its x-axis position.

A fourth measurement is shown at 392. Five volts are applied to connector 207 and connector 206 is grounded. A voltage measurement is made of voltage V4 appearing at connector 212. Voltage V4 is directly proportional to the distance of the centre of the applied force from connecting portion 216 and indicates its y-axis position. Consequently, voltage V3 and voltage V4 provide information as to the two-dimensional position of the applied force on the sensor. Consequently, voltages V3 and V4 represent x and y values respectively for the centre of the position of the applied force.

Figure 4:
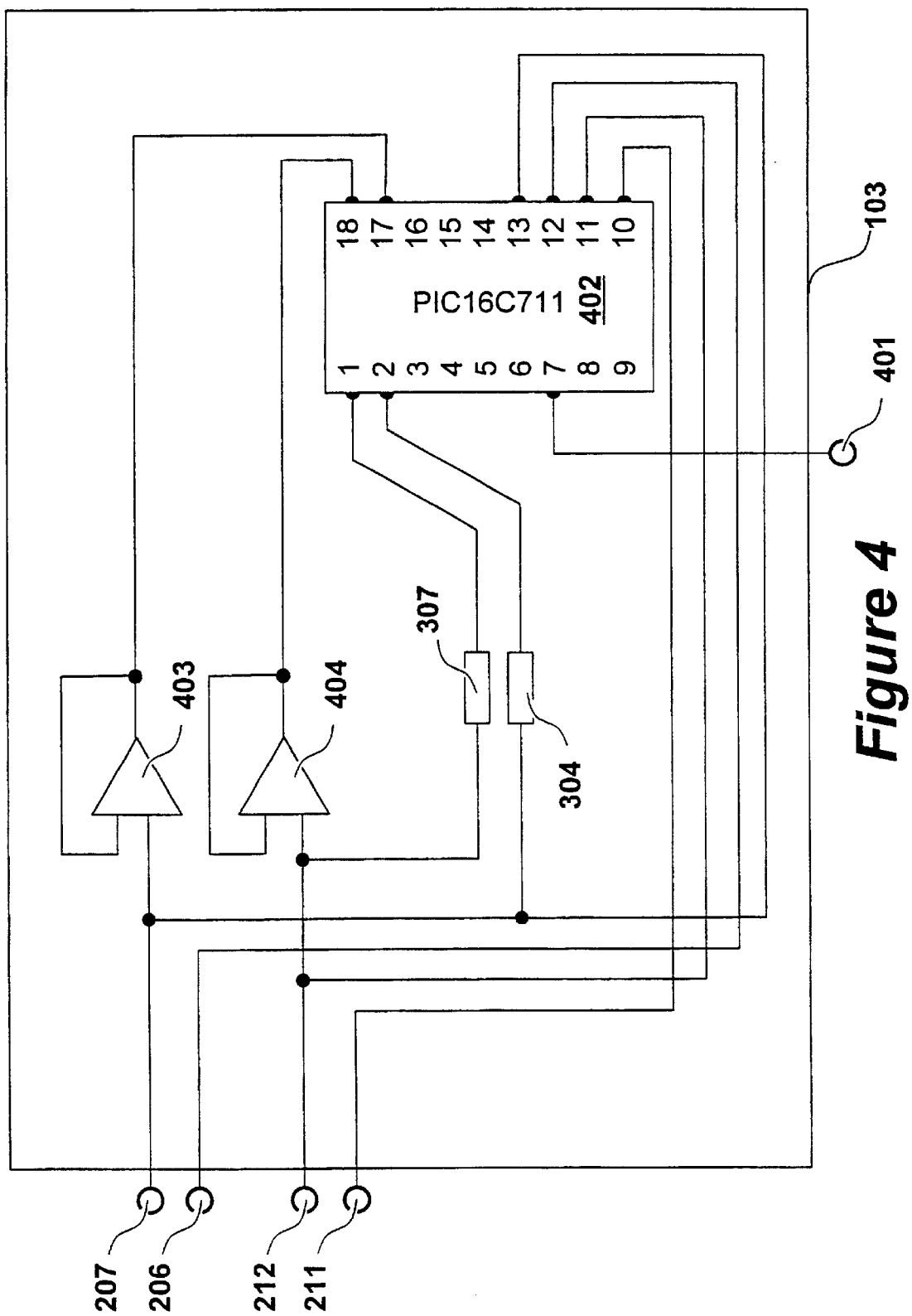
FIG. 4 details the interface circuit shown in FIG. 1.

Interface circuit 103 is detailed in FIG. 4. The interface circuit supplies voltages to connectors 206, 207, 211 and 212 and measures voltages V1, V2, V3 and V4. The interface circuit also provides output values at serial communication output 401, consisting of values corresponding to the xy two dimensional positions of the mechanical interaction of the sensor and the z value depending upon the area of the mechanical interaction or the area and force of the mechanical interaction.

When designing an interface circuit, resistors 304 and 307 are chosen according to the resistance of the sensor as measured from one connector on layer 201 to another connector on layer 202, while a typical target pressure is applied to the sensor. A value of ten Kohms is typical for resistors 304 and 307.

The measurement process is controlled by a program running in a peripheral interface controller (PIC) 402, such as type PIC 16C711. As well as being capable of supplying the required output voltages of pins one, two, ten, eleven, twelve and thirteen, the PIC 402 includes an analogue to digital converter that it uses to process analogue voltages received at input pins seventeen and eighteen. Input pins seventeen and eighteen receive outputs from high impedance buffers 403 and 404 respectively. Buffers 403 and 404 are half of a unity gain operational amplifier of type TL 062 and provide a high impedance buffer between the sensor output voltages and the PIC 402 input ports.

Processor 402 has an external crystal oscillator running at 4 Mhz connected across pins fifteen and sixteen. Positive five volts is applied to pin fourteen and pin five is connected to ground. Pin 4 (internal reset) is held at a positive five volts via a series resistor of 100 ohms.

Figure 5:
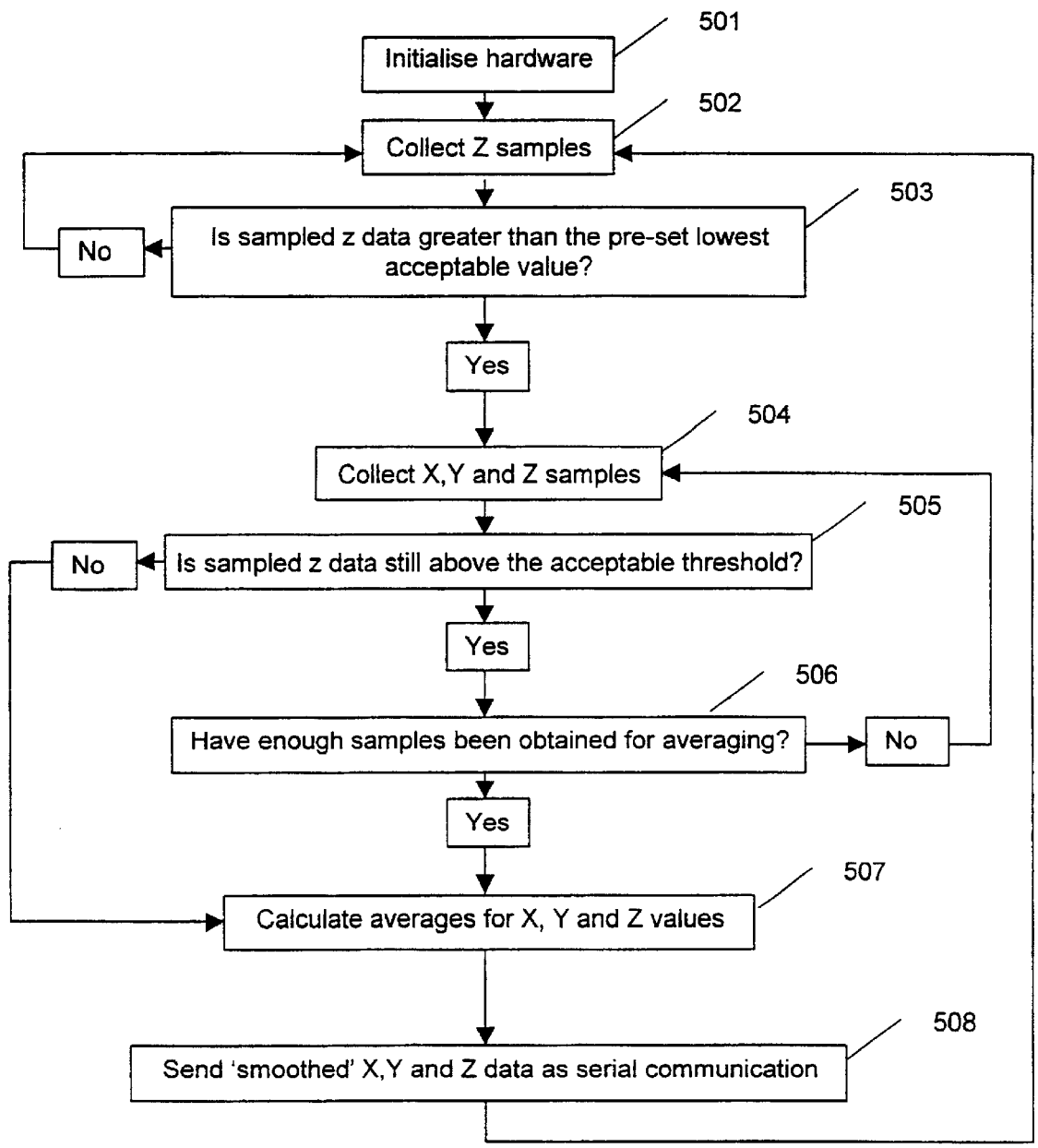
FIG. 5 illustrates a program executed by the processor of the interface circuit.

The program executed by the PIC processor is illustrated in FIG. 5. At step 501 the hardware is initialised and at step 502 circuit 103 measures values of voltages V1 and V2 and calculates the z value of the interaction.

At step 503 a question is asked as to whether the z data is greater than a predetermined value and if answered in the negative, the program returns to step 502. Thus, the circuit measures z values until a z value greater than a predetermined value is detected.

If the answer to the question asked at step 503 is answer in the affirmative, the circuit measures voltages V1, V2, V3 and V4 and thereafter calculates a z value at step 504.

At step 505 a question is asked as to whether the calculated z value is still above the predetermined value. If the question is answered in the affirmative, a further question is asked at step 506 as to whether enough samples have been obtained. Typically, between three and ten sets of samples are taken, with less samples being taken when a fast response time is required. If the question asked at step 506 is answered in the negative, the program returns to step 504 and a further set of measurements are made. When the question asked at step 506 is answered in the affirmative, or when the answer to the question asked at step 505 is answered in the negative, the program calculates average values of the samples of the voltages V3 and V4 and of the values of z which have been collected. Thus, the program measures a predetermined number of voltages before finding the average values, or if the z value drops below a predetermined value, the average values are calculated immediately. By using the average of a number of samples the effect of mains power electromagnetic interference or other such environmental noise may be minimised.

A relatively straightforward calculation to find an average value for the x values is to find the mean average of the maximum and minimum values of the stored values V3 thus presenting a smoothed value for x which is found by adding the maximum value stored for value V3 to the minimum value stored for V3 and dividing the result by two.

To further improve accuracy, values of x, y and z that differ by a large amount from their immediately preceding and immediately subsequent value are excluded from the calculations of the average. In addition, known method of eliminating mains electricity supply interference may be applied to signals received from the sensor.

At step 508 the average values for V3 and V4, representing xy positional co-ordinates and the average values for z data are supplied as outputs at the serial communication output 401. The program then returns to step 502 and looks for an indication of a further mechanical interaction.

Figure 6:
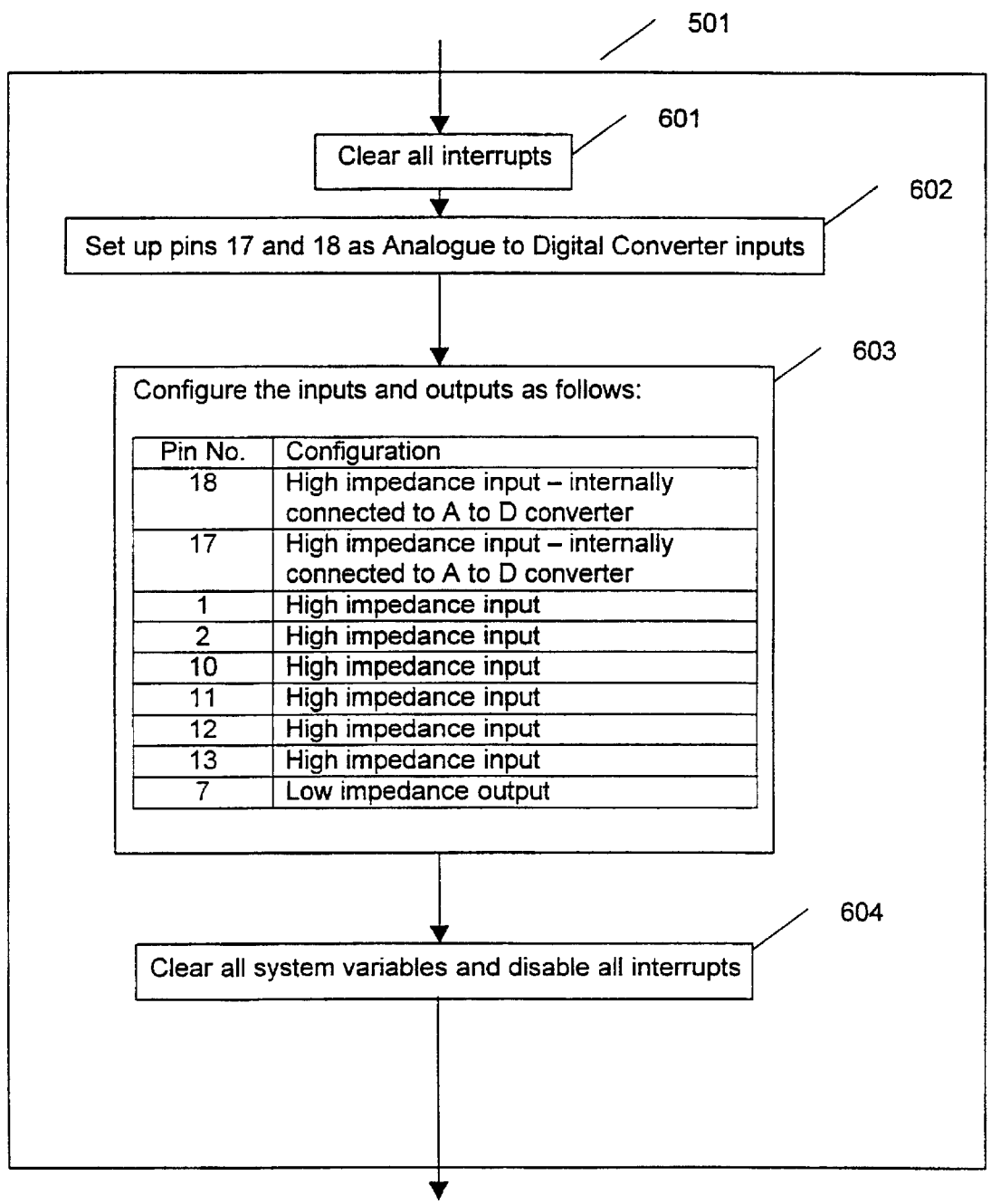
FIGS. 6, 7 and 8 detail procedures identified in the program illustrated in FIG. 5.

Step 501 is detailed in FIG. 6. At step 601 interrupts are cleared and at step 602 pins seventeen and eighteen are set up as analogue to digital converter inputs. The microports of the PIC 16C711 may be configured as low impedance outputs or high impedance inputs. When in high impedance input mode, pins seventeen and eighteen can be programmed to connect via an internal multiplexer to the analogue to digital converter.

At step 603 the ports which are to be used as inputs or outputs are configured in their initial state. At step 604 all system variables are cleared and all interrupts are disabled.

Figure 7:
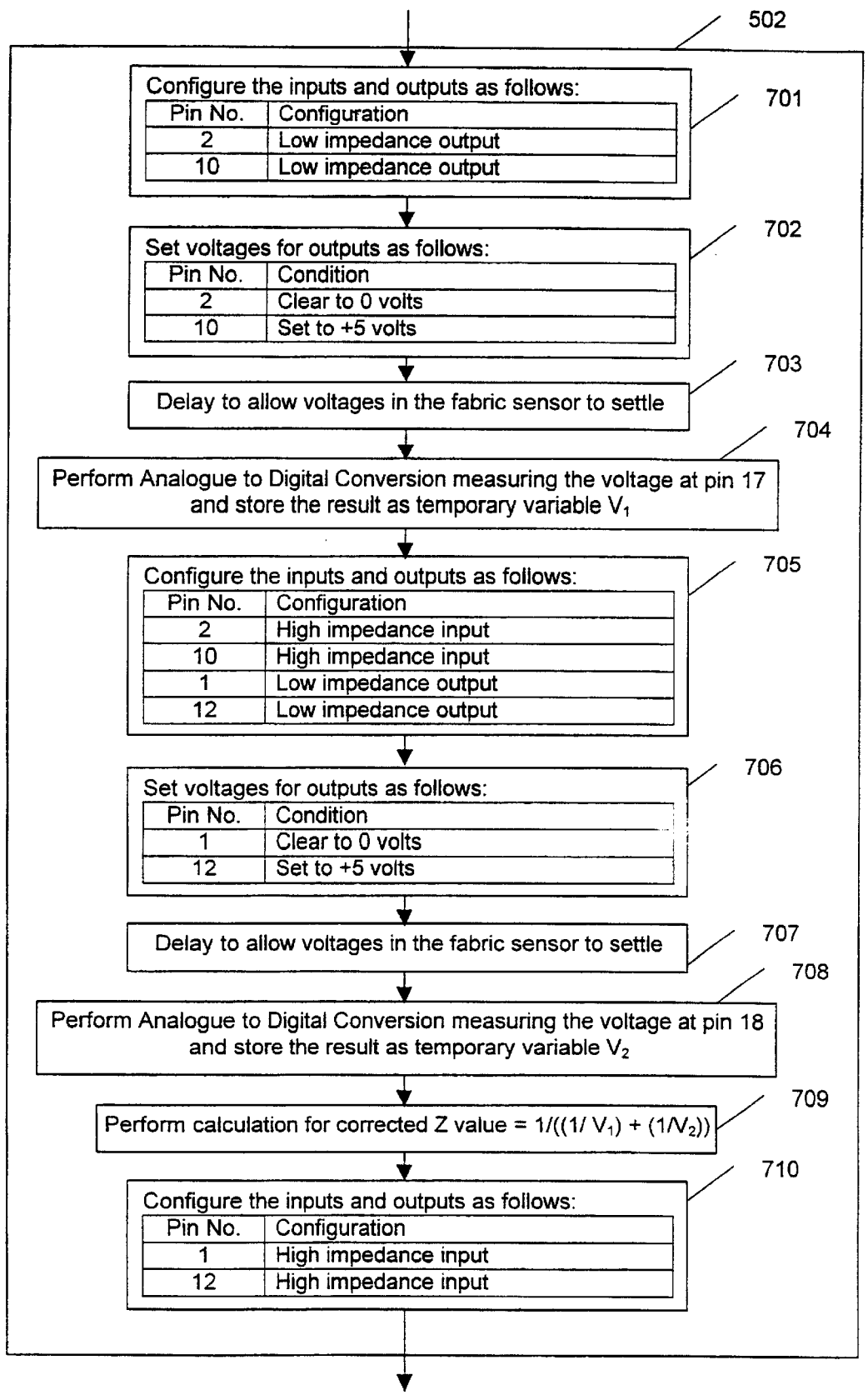

Step 502 is detailed in FIG. 7. At step 701 the ports corresponding to pins two and ten are reconfigured as output ports and at step 702 pin two is set to zero while pin ten is set to positive five volts. Thus, connector 207 is grounded via resistor 304 and five volts are applied to connector 211. At step 703 a time delay of typically two hundred-and-fifty microseconds is provided for a typical sensor measuring a hundred millimeters by a hundred millimeters. This delay allows voltages to settle before the voltage at pin seventeen is measured and stored. Thus, voltage V1 present at connector 207 is measured at this step.

At step 705 pins two and ten are reconfigured as high impedance inputs while pins one and twelve are reconfigured as low impedance outputs. At step 706 the voltages on pins one and twelve are set to zero and positive five volts respectively. Thus, connector 212 is grounded via resistor 307 while five volts are applied to connector 206.

A suitable time delay, equivalent to that at step 703 is provided at step 707 before the voltage at pin eighteen is measured at step 708. Thus, the voltage present on connector 212 is measured and stored as voltage V2. At steps 709 a z value is calculated for stored voltages V1 and V2 and then stored. Pins one and twelve are reconfigured back to their initial state as high impedance outputs at step 710.

Figure 8:
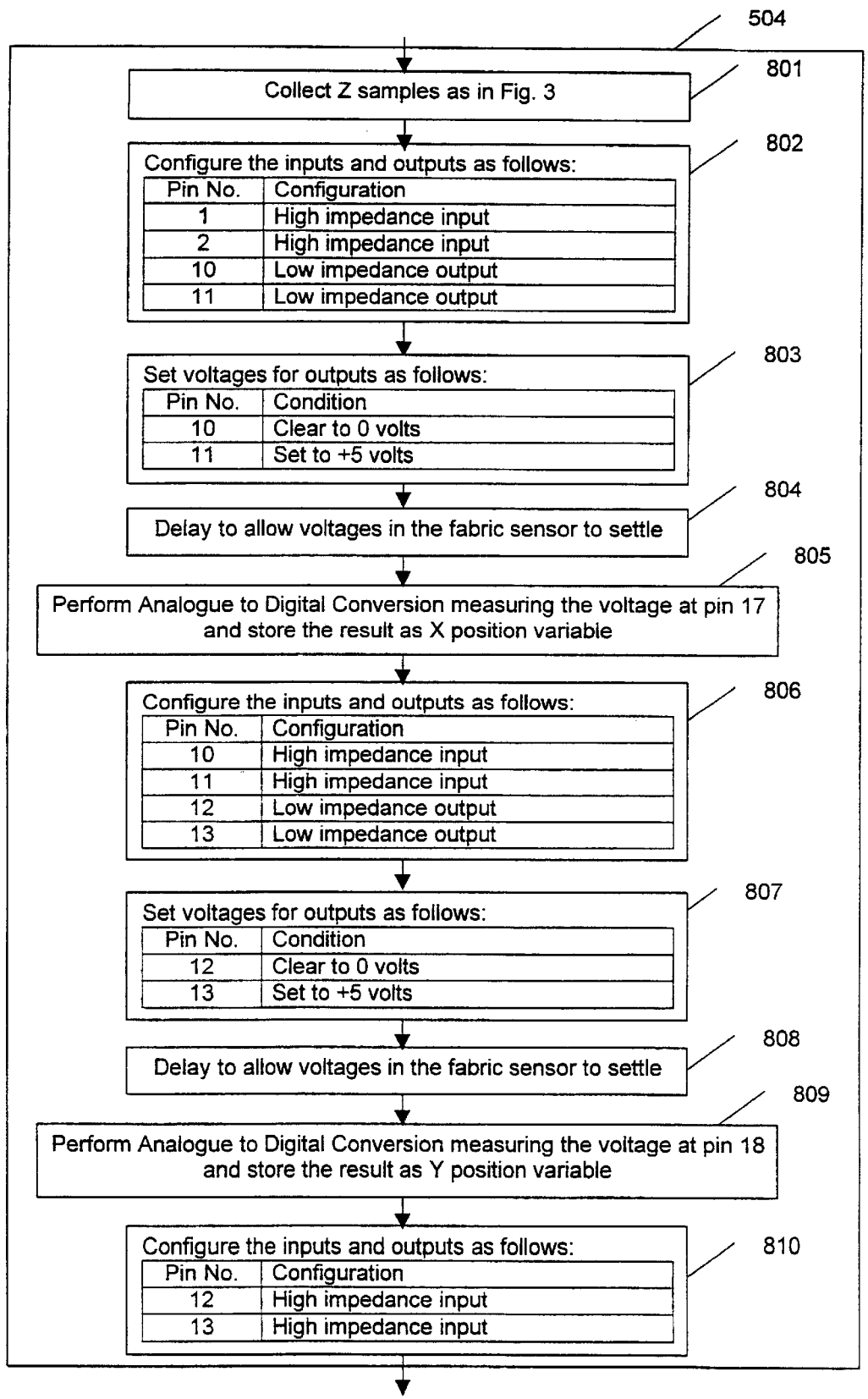

Step 504 is detailed in FIG. 8. At step 801 a z value is collected in a substantially similar manner as performed at step 502. At step 802 pins one and two are reconfigured as high impedance inputs and pins ten and eleven as low impedance outputs. At step 803 pin ten is set to zero volts and pin eleven is set to positive five volts. Thus, five volts are supplied to connector 212 while connector 211 is grounded. A delay is provided at step 804 (typically one millisecond for a device measuring 100 millimeters by 100 millimeters) to allow voltages in the sensor to settle before the voltage on pin seventeen is measured at step 805. Therefore, a voltage V3 present on connector 207 is measured that provides an indication of the x position of the applied force.

Pins ten and eleven are reconfigured as high impedance inputs and pins 12 and 13 are reconfigured as low impedance outputs at step 806. The voltage on pin 12 is set to zero while the voltage on pin 13 is set to five volts at step 807. Thus, five volts are supplied to connector 207 while connector 206 is grounded.

A time delay is provided at step 808, similar to that provided at step 804, before the voltage appearing on pin 18 is measured at step 809. Thus, a voltage V4 present on connector 212 is measured which provides an indication of the y position of the applied force. Pins 12 and 13 are then reconfigured back to their initial stage of high impedance inputs.

The procedures described with reference to FIGS. 5 to 8 allow the interface circuit to make voltage measurements V3 and V4 which provide an indication of the position of the mechanical interaction applied to the fabric sensor. Similarly, measurements of voltages V1 and V2, that are proportional to currents passing through the sensor, provide information as to a second characteristic of the mechanical interaction. The second characteristic may, for example, be an area of interaction or, typically, a combination of area and force. Furthermore, the circuit combines the voltages V1 and V2 to determine a z value representative of the second characteristic.

The circuit 103 provides output data representative of x and y position of the applied force and the z value. However, in an alternative embodiment, the interface circuit provides output data corresponding to the measured voltages V1, V2, V3 and V4. In an alternative embodiment, sophisticated further processing is performed upon these voltages that may in turn be used to control other peripheral equipment. For example, as an alternative to having a separate control device for generating infra-red signals, as shown in FIG. 1, all of this functionality could be enclosed within a single control circuit within the PIC processor 402 controlling the generation of infra-red signals. The arrangement therefore provides a fabric-made position detector with a first fabric electrically conducting layer and a second fabric electrically conducting layer. The first electrically conducting layer has a first electrical contact and a second electrical contact with the second electrically conducting layer having a similar third electrically conducting contact and a fourth electrically conducting contact. Potential is applied across the first contact and the third contact to produce a first current and then a potential is applied across the second contact and the fourth contact to produce a second current. Each of these currents are measured and then values are processed in order to produce an output indicative of a property of a mechanical interaction. In this way, more accurate results are obtained in preference to a system where only one current measurement is made.

When current flow takes place, current densities may be expressed graphically by lines of flux where the concentration of flux lines is greater in areas where the current density is greater. As is well known in the art, similar graphical representation may be produced by connecting equipotentials and, as is known, the equipotentials are perpendicular to the flux lines positions of intersection.

Figure 9:
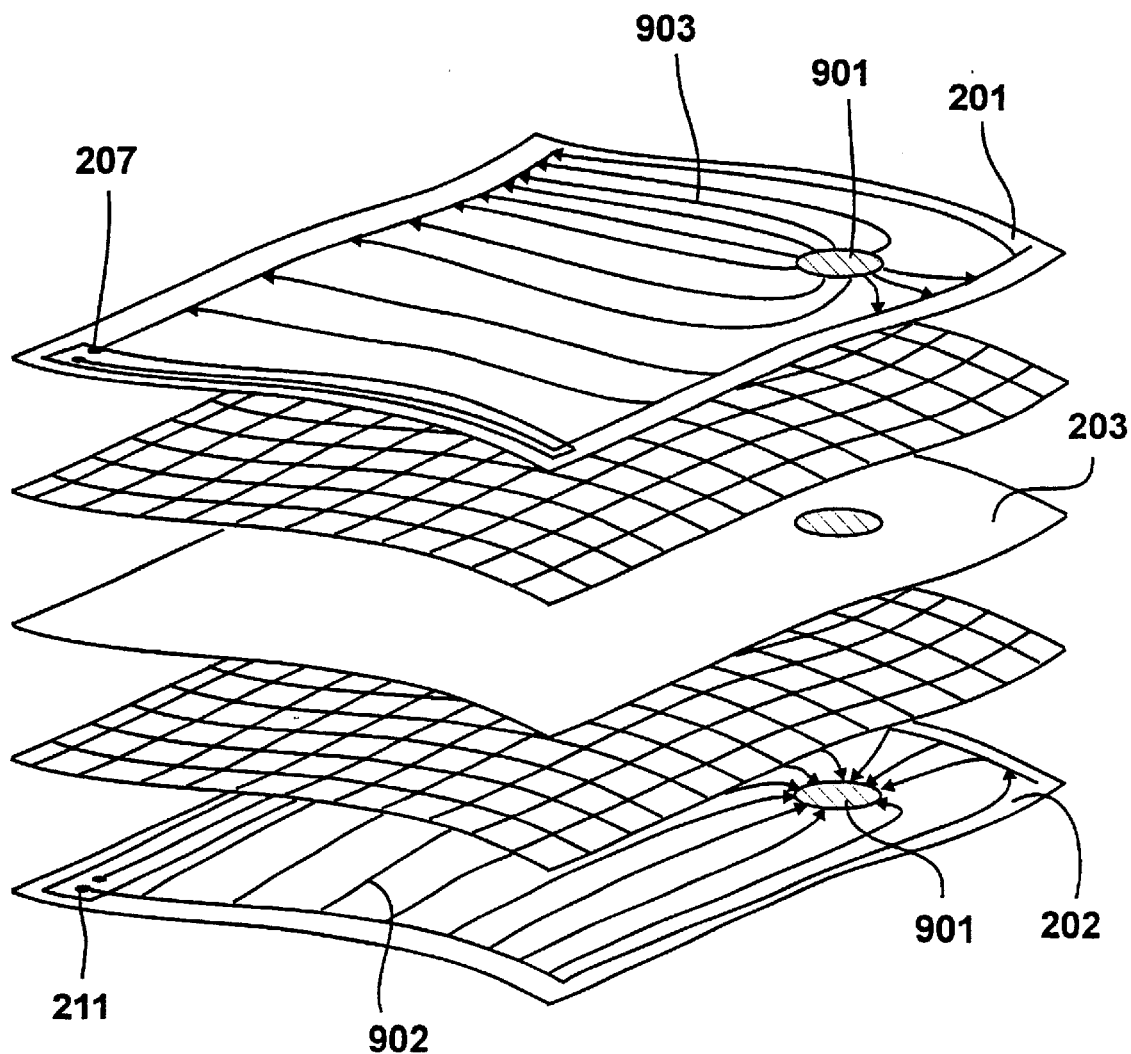
FIG. 9 illustrates an arrangement similar to that shown in FIG. 2, showing lines of current flux.

An arrangement similar to that shown in FIG. 2 is illustrated in FIG. 9 in which lines of current flux are shown passing through first conducting layer 201 with similar flux lines being shown in the second conducting layer 202. The current flows between layers at a point of mechanical interaction 901. A positive potential is applied to connector 211 resulting in current flow, as illustrated by flux line 902 flowing to the point of mechanical interaction 901. Current passes through the central conducting layer 203 at the point of mechanical interaction and then flows across the first conducting layer 201, as illustrated by flux line 903 to then sink through contact 207.

Figure 10A:
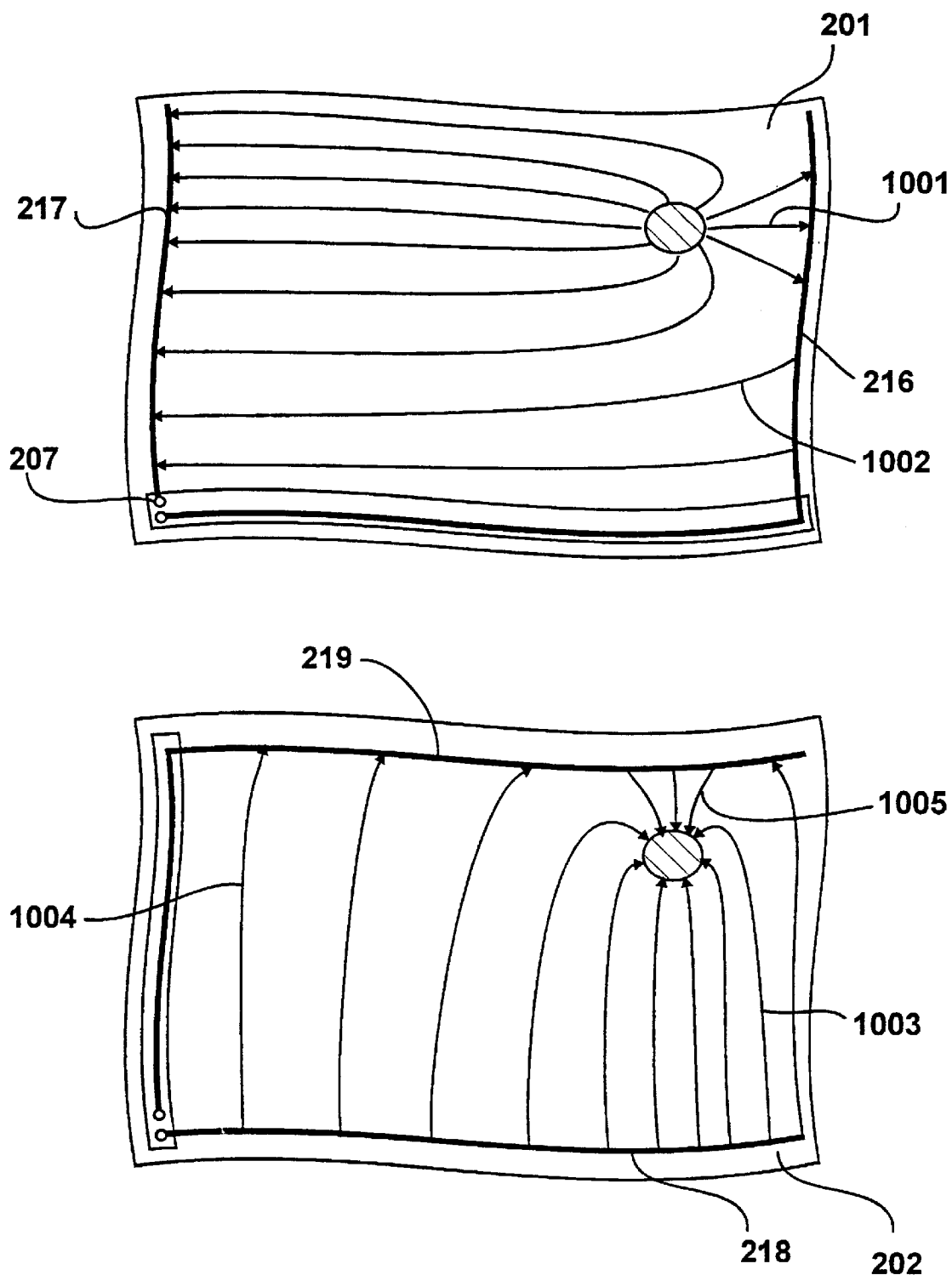
FIGS. 10a and 10b illustrate a two dimensional representation of the arrangement shown in FIG. 9.

A two dimensional representation of layer 201 and layer 202 is shown in FIG. 10a. Most of the current reaches contact 207 via connecting portion 217. However, some of the current passes through connecting portion 216 as illustrated by flux lines 1001. This current then reenters the conducting layer to return to contacting portion 217, as illustrated by flux line 1002. The contribution to the measured conductivity resulting from this effect is greater when the point of mechanical interaction is close to an edge of the detector and is particularly prevalent when the point of mechanical interaction is close to a corner of the detector.

A similar effect occurs on the lower conducting layer 202. Thus, in addition to current being received directly from connecting portion 218, as illustrated by flux lines 1003, some of the current travels through connecting portion 219, as illustrated by flux lines 1004 and 1005.

A similar problem occurs when the current direction through the sensor is changed, as required by the present invention. However, depending on the position of the mechanical interaction, there is a tendency for the effect to be more prevalent with current flow in one direction than with current flow in the other direction. This is emphasised with respect to FIG. 10b. On this occasion, the point of mechanical interaction is close to the supply rails therefore virtually all of the current will flow directly to the point of mechanical interaction in the upper layer, as illustrated by flux line 10021 with a similar effect occurring in conductive layer 202, with a current flowing directly away from the point of mechanical interaction as illustrated by flux line 10022.

In the resistive modelling described with reference to FIG. 3, no account was taken of this second potential method for current flow, as illustrated by flux lines 1001, 1002, 1003 and 1004. A revised model is therefore illustrated in FIG. 11, in which potentiometers 1101, 1102 and 1103 are substantially similar to potentiometers 301, 302 and 303. However, in order to model the activity of the device in accordance with FIG. 10a and 10b, the first shunt resistor 1111 is placed across potentiometer 1101 and a second shunt resistor 1112 is placed across resistor 1102. Such an arrangement introduces greater complexity in terms of producing accurate results of z values. Furthermore, relationships for combining the two measurements must be re-evaluated. In particular, relationship 301 is based on a more simplistic model and will not strictly hold true for the model illustrated in FIG. 11.

A solution to this problem is provided by fabricating the conductive layers with anisotropic conductivity. In particular, it is desirable to measure resistance in the linear direction between the contacting portions, such as 216 and 217 this effectively minimises the resistances 1111 and 1112. It is undesirable to introduce resistive effects perpendicular to this direction. Consequently, the material is fabricated with a greater resistivity in the desired linear direction (horizontal in the first later 201 shown in FIG. 10a and vertical in layer 202 shown in FIG. 10a) while resistance is reduced (ie conductivity increased) in a perpendicular direction.

Figure 12:
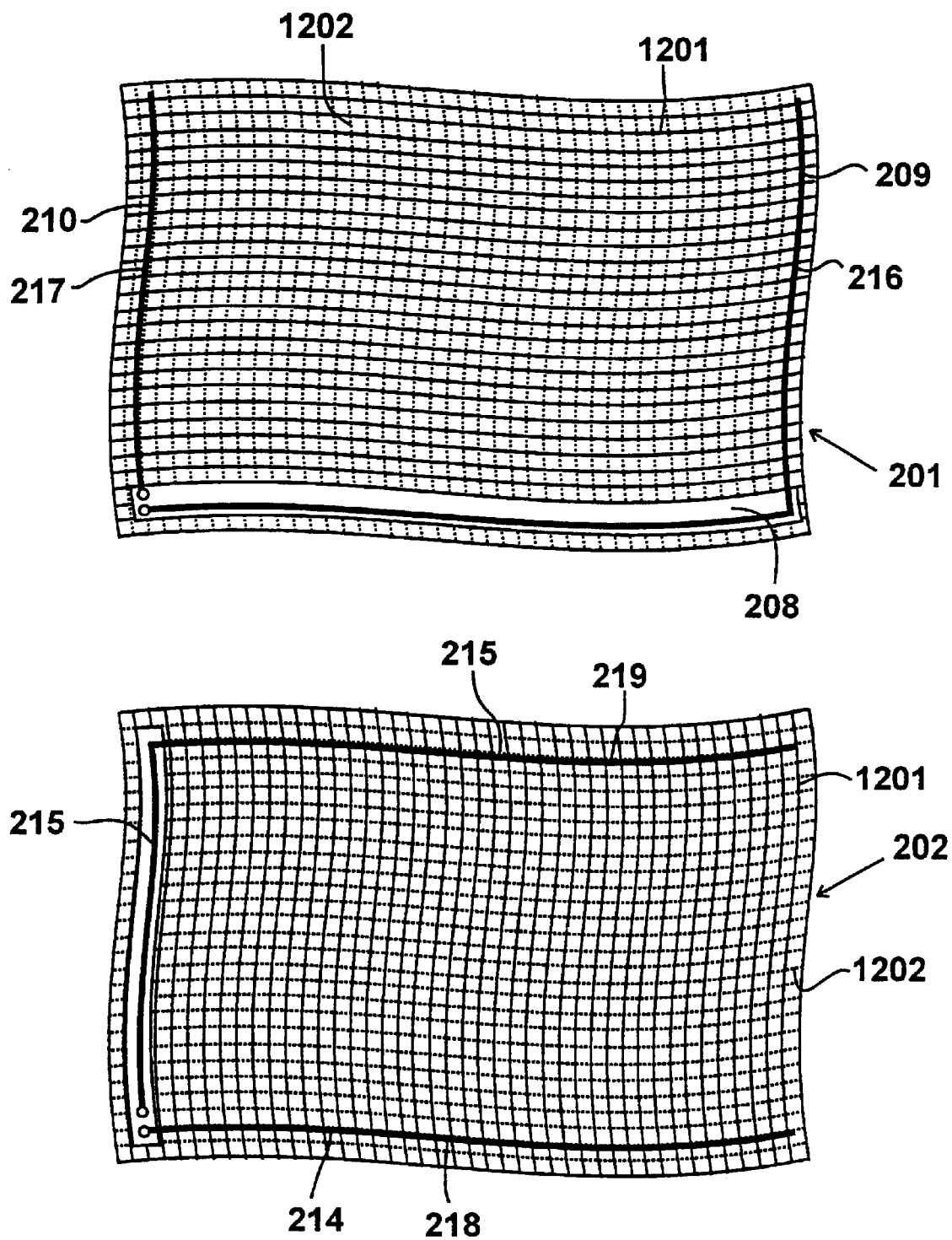
FIG. 12 shows the upper and lower fabric layers identified in FIG. 2.
Figure 13:
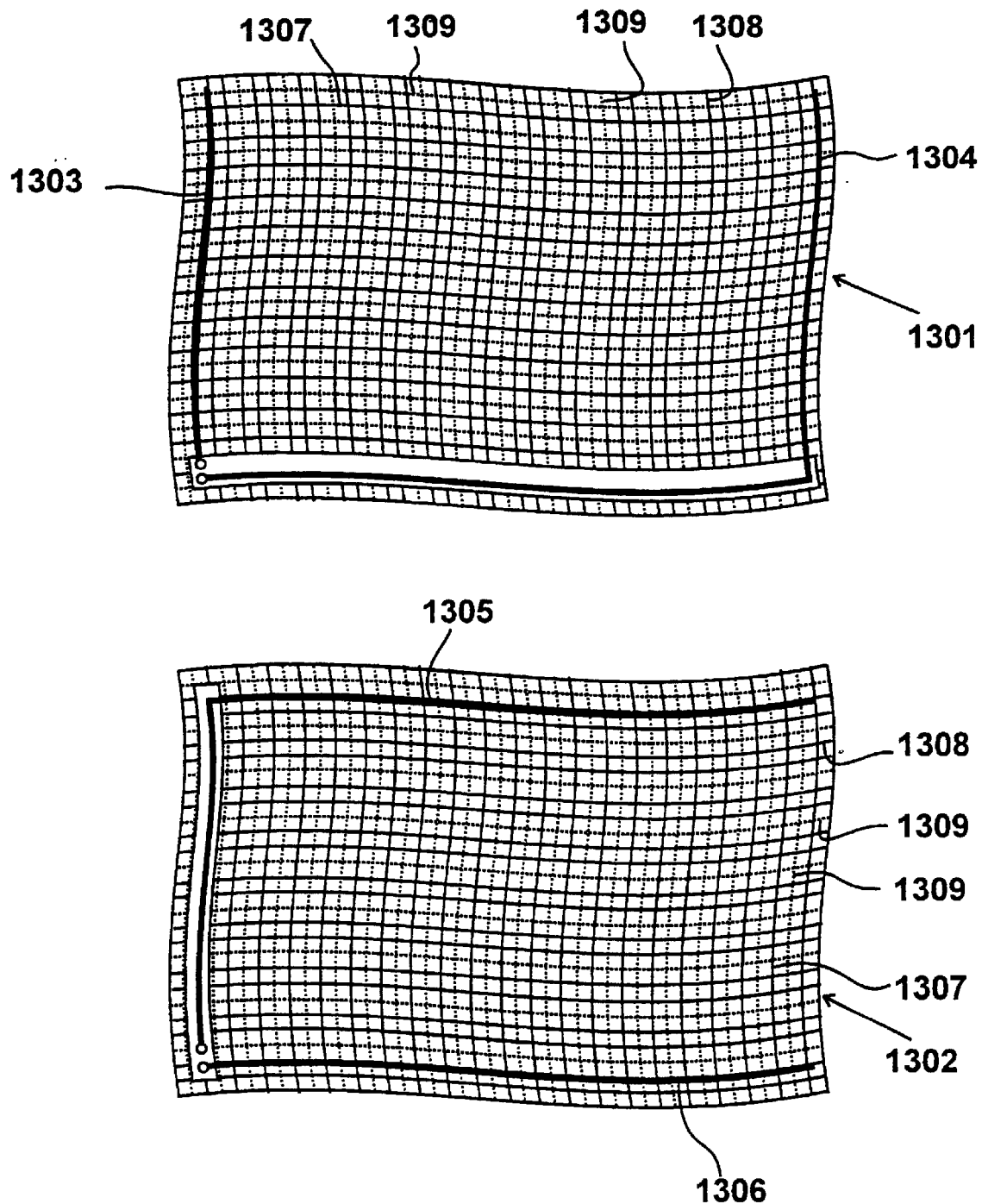
FIG. 13 identifies alternative fabric layers to those shown in FIG. 12.

The upper and lower fabric layers 201 and 202 are shown separately in FIG. 12. The fabric layers 201 and 202 are plain weaves having conductive fibres in both the warp and the weft directions and are conductive in all directions along the respective layers. In FIG. 12, the warp fibres 1201 of layer 201 are shown approximately horizontal and extend between two contacting portions 216 and 217, while the weft fibres 1202 are parallel to the contacting portions 216 and 217 and are shown approximately vertical. In layer 202, the substantially vertical warp fibres extend between the contacting portions 218 and 219, while the weft fibres 1202 are parallel to the contacting portions 218 and 219 and are shown approximately horizontal.

Layers 201 and 202 have anisotropic conductivity. In particular, layers 201 and 202 are more conductive in the directions parallel to their respective contacting portions. Thus, when the detector is operated and a voltage gradient is applied between a pair of contacting portions on the same layer, the respective layer is most conductive in the direction perpendicular to the voltage gradient and less conductive parallel to the voltage gradient. To achieve the desired anisotropic conductivity, the warp fibres are chosen to be of a higher resistance that the weft fibres. For this reason, the warp fibres 1201 are 24 decitex nylon 6 fibres (obtainable from BASF and identified by the designation F901) and are generally available for use in electrostatic dicipation applications. The weft fibres are 16 decitex monofilament fibres, electrochemically coated with nickel and/or silver, and available under the trademark "XSTATIC" from Sauquoit Industries Inc of Pennsylvania USA. Similar metalised fibres are commonly available and are normally used in electromagnetic interference shielding. Thus, a typical resistivity for a weft fibre is 500 ohms per centimeter, as opposed to approximately 200 Kohms per centimeter for the warp fibre.

In layer 201 and 202 the fabric is woven with the same average spacing of 7.3 fibres per millimeter for both the weft and the warp. Consequently, due to different resistivity of the warp and weft fibres, the sheet resisitivity of the layers in the directions parallel to the contacting portions is approximately 400 times less than the sheet resistivity in the perpendicular direction.

In an alternative embodiment, the outer fabric layers 201 and 202 are replaced by outer fabric layers 1301 and 1302 similar to that of layers 201 and 202, except for the type of fibres used in the weft and in the warp. Thus, contacting portions 1303 and 1304 are located along opposing edges of layer 1301 and contact conductive fibres within said layer, while contacting portions 1305 and 1306 are located along the alternative opposing edges of the layer 1302 and make electrical contact with conductive fibres within layer 1302.

Outer layer 1301 includes conductive fibres 1307 that conduct in the direction of the current flowing from contacting portion 1303 to contacting portion 1304. Cross threads 1308 conduct in a direction perpendicular to this one and have the effect of insuring a linear voltage gradient across the sheet, even when the resistance of connections between lateral fibres 1307 with a contacting portion 1303 and 1304 are variable; as would be expected in a manufacturing process.

Insulating fibres 1309 are used between adjacent parallel conducting fibres 1307 in the warp direction and between adjacent parallel conducting fibres 1308 in the weft direction. Anisotropic conductivity is achieved, in the present embodiment, by selecting a different ratio of conductive fibres 1307 and 1308 to non-conductive fibres 1309 for each of the warp and weft directions. Thus, in a direction perpendicular to the contacting portions 1303 and 1304, which is horizontal in the drawing of layer 1301 shown in FIG. 4, an insulating fibre alternates with a conducting fibre 1302. There is an equal quantity of both. However, in the perpendicular direction, there are two conducting fibres 1308 for each parallel insulating fibre 1309. Thus, when the sensor is operated, in the direction perpendicular to the applied current flow, or the direction perpendicular to the voltage gradient, conductivity is increased.

Outer fabric layer 1302 has a similar structure to layer 1301 but is rotated through 90 degrees. Consequently, the weave includes weft fibres which are substantially parallel to contacting portions 1305 and 1306 and warp fibres which are perpendicular to contacting portions 1305 and 1306. The layer 1302 is anisotropic in a similar manner to layer 1301, since its weave contains two conductive fibres 1308 for every insulating fibre 1309 in the weft, while containing an equal number of conducting fibres 1307 to insulating fibres 1309 in the warp.

In this embodiment, the conducting fibres 1307 and 1308, in both the weft and warp directions, may be of equal resistivity since the anisotropic conductivity of the layers is achieved by selection of the ratios of conductive fibres to insulating fibres. Therefore, a similar carbon coated nylon fibre may be used in both the weft and in the warp directions of the weave.

By making two current measurements and processing the results in combination, it is possible to achieve improved accuracy, in terms of assessing the extent of a mechanical interact ion. The accuracy of this measurement may be improved further by using anistropic layers which have greater conductivity in directions perpendicular to the current flow. Furthermore, further accuracy may be achieved by modifying the way in which the measurements are processed in combination. In particular, better results are achieved if the reciprocals of the measurements are added and then the resulting total itself reciprocated; akin to combining resistances in parallel as distinct to combining resistances in series.

Figure 14A:
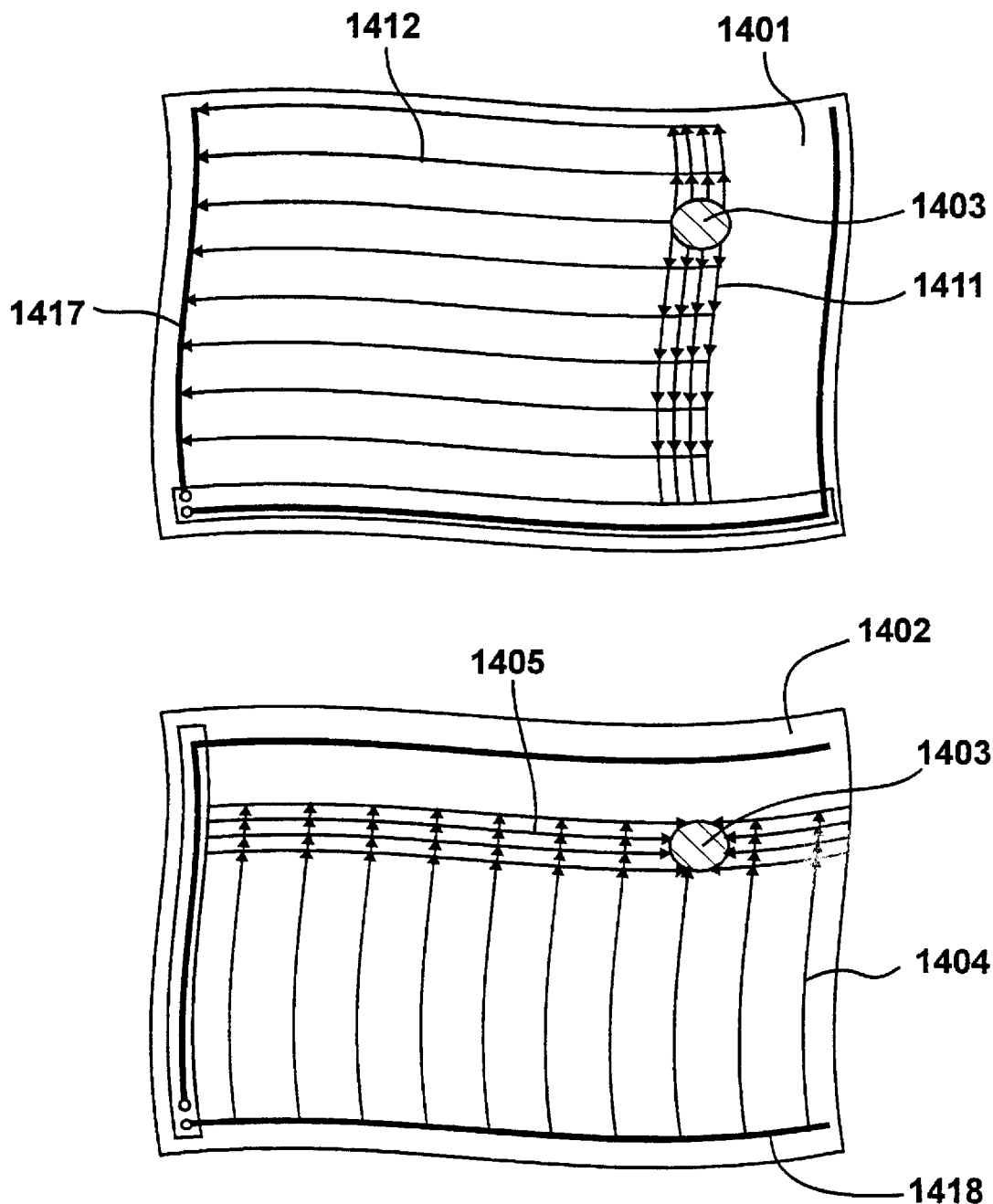
FIGS. 14a and 14b illustrate flux densities for the fabric layers identified in FIG. 12.

Current flux for upper layer 201 and current flux for lower layer 202 are illustrated in FIG. 14a where layers 201 and 202 are constructed using anisotropic fabrication. The arrangement in FIG. 14a illustrates current fluxes in response to a mechanical interaction substantially similar to that shown in FIG. 10a and with substantially similar voltages applied to the electrical contacts. Similarly, 1401 and 1402 are illustrated in FIG. 14b with a similar mechanical interaction but with the current flows reversed so as to be substantially similar to the arrangement shown in FIG. 10b.

In the arrangement shown in FIG. 14a, current flows from in layer 1402 a conductive portion 1418 towards a position of mechanical interaction 1403. The current flows from portion 1418 in substantially parallel lines 1404, some of which go directly towards the point of mechanical interaction 1403. In other situations, the flux is diverted and then traverses substantially perpendicular to lines 1404 along lines 1405. Current easily flows in this direction given the relatively lower resistivity of the fabric layer in this direction.

In the upper layer 1401, the current emerges at the position of mechanical interaction 1403 and again easily moves outwards in the perpendicular direction along the lines of flux 1411. Current flow towards the portion 1417 then takes place along substantially parallel lines of flux 1412.

Figure 10B:
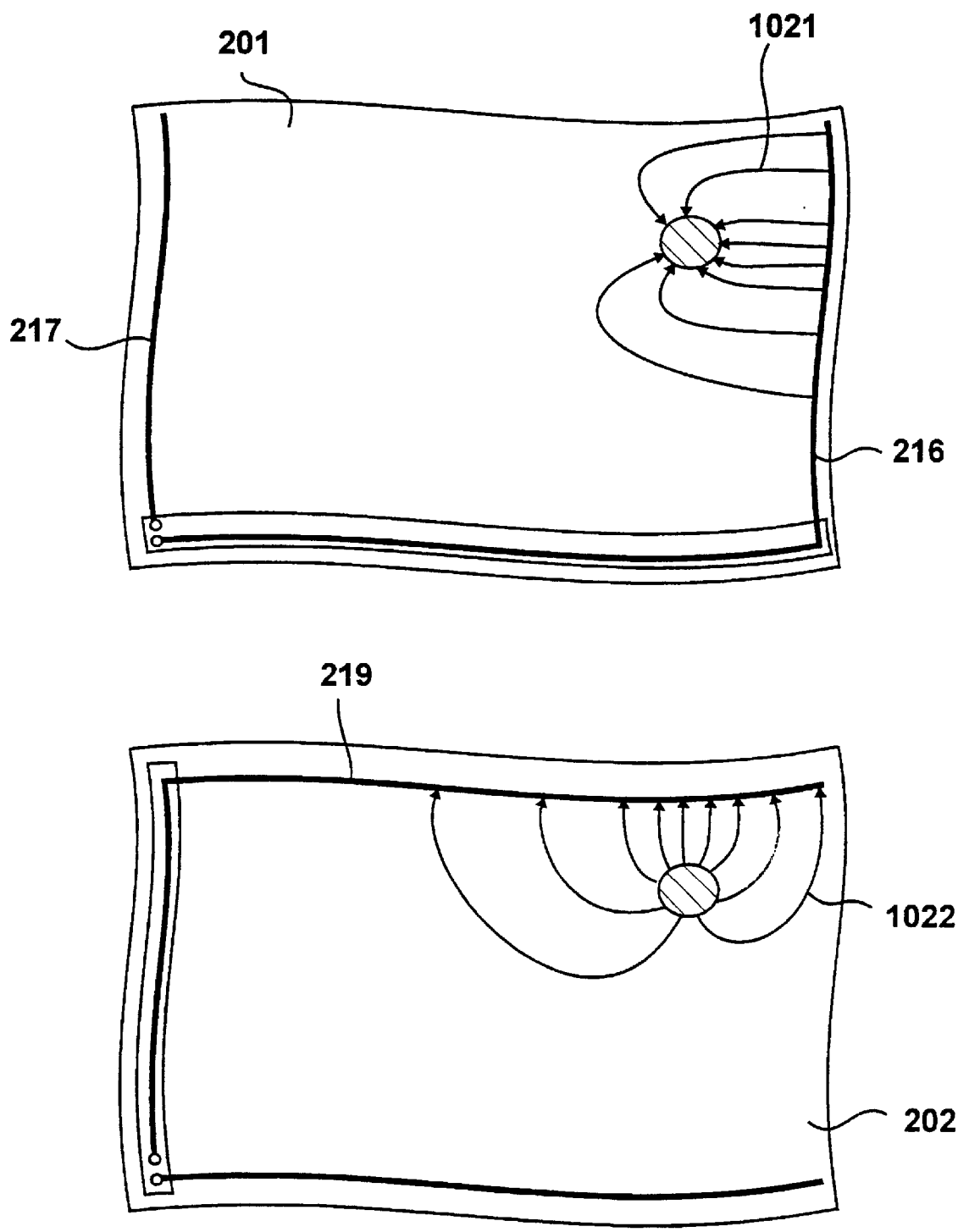
Figure 11:
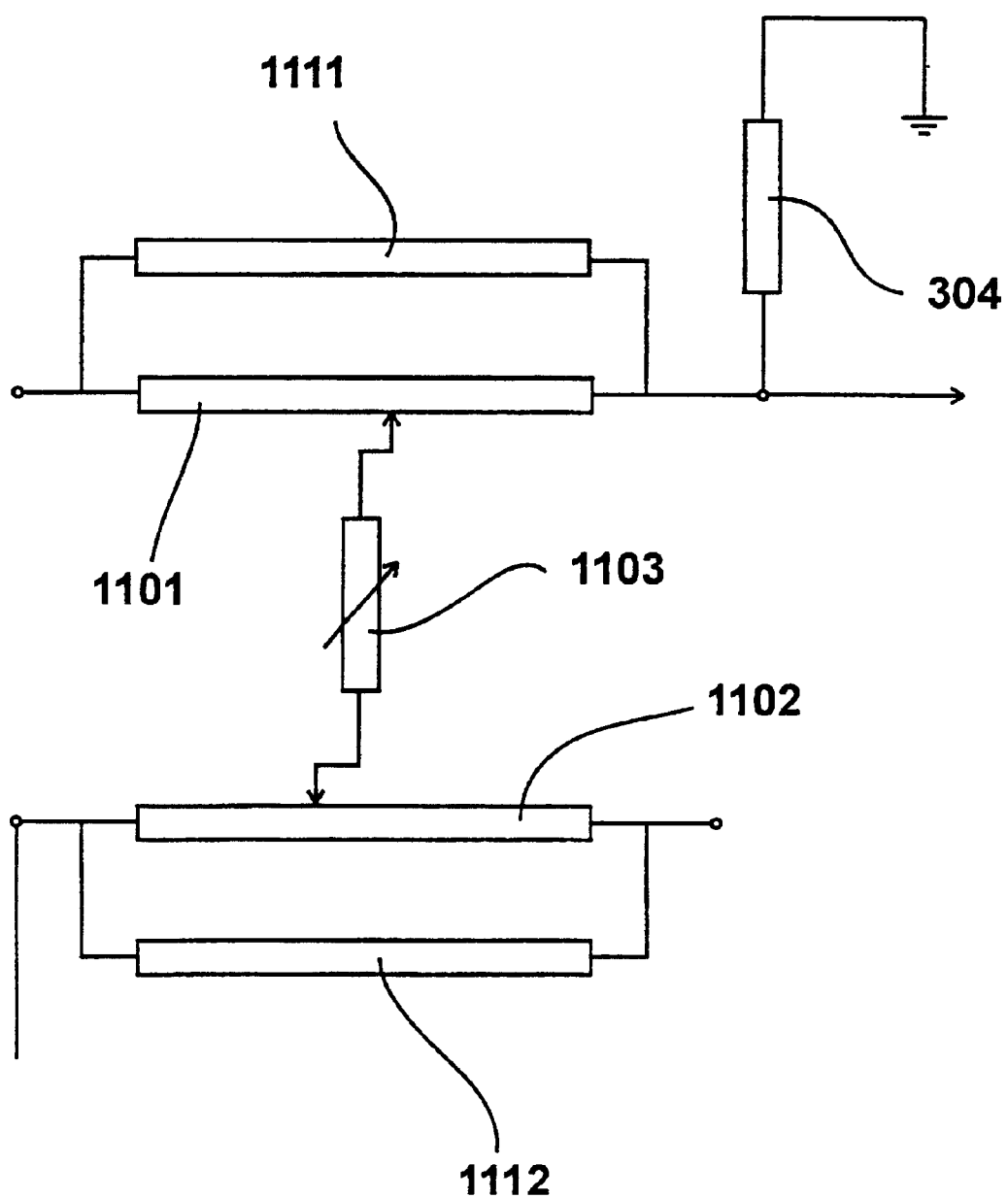
FIG. 11 shows a revised model for resistances.
Figure 14B:
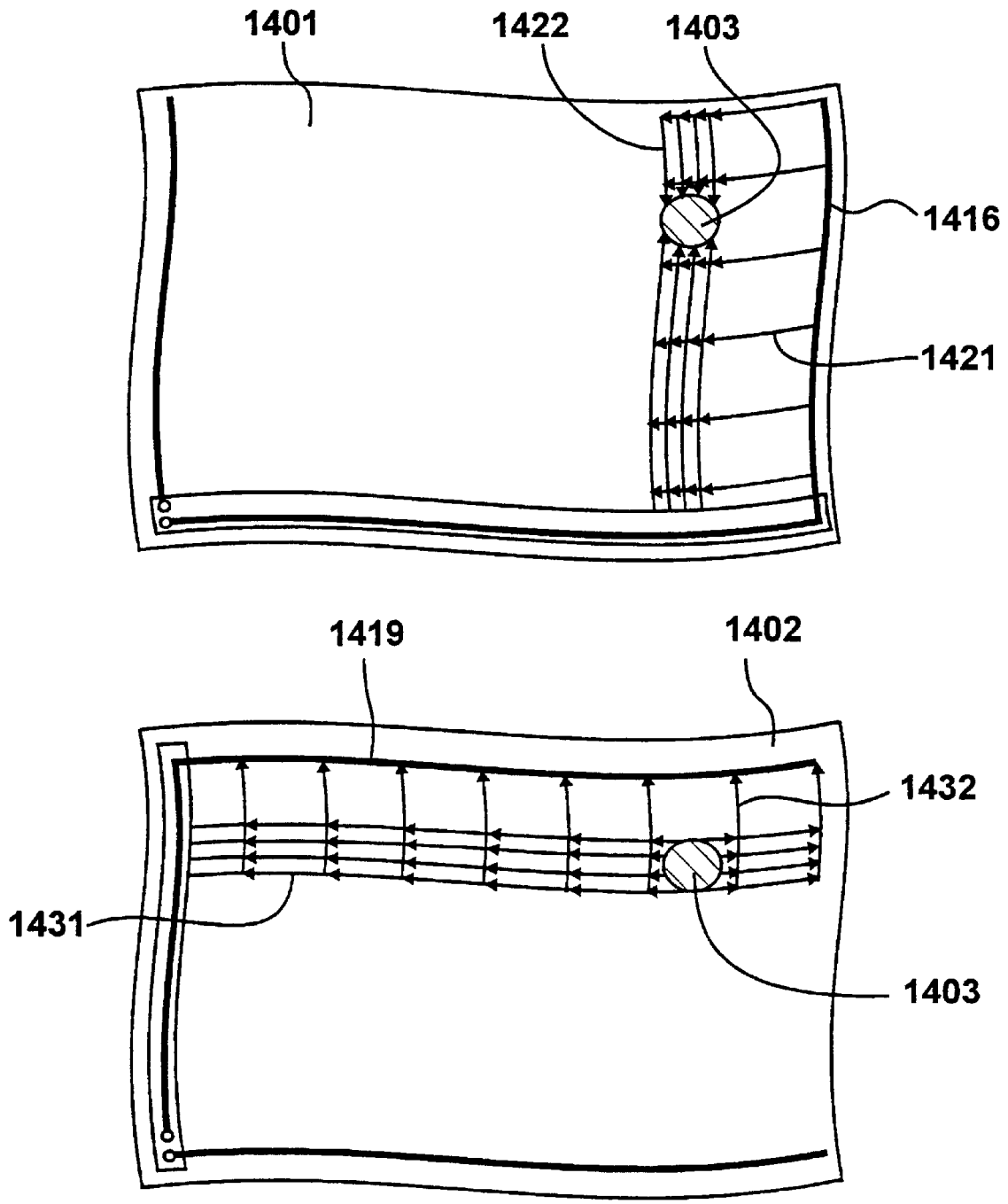

A resulting flow of current occurring when the direction of flow is changed is shown in FIG. 14b, which represents a condition similar to that shown in FIG. 10b except that anisotropic conducting layers are being used. On this occasion, current initially flows from contacting portion 1416 towards the point of mechanical interaction 1403. Again, the flow of current from portion 1416, indicated by flux lines 1421 is substantially parallel, whereafter perpendicular flow, illustrated by flux; lines 1422 occurs in the perpendicular direction towards the position of mechanical interaction 1403.

On the lower conducting layer 1402 the current emerges at the position of mechanical interaction 1403 and then easily conducts in the perpendicular direction, as illustrated by flux line 1431. The current is then directed towards contacting portion 1419 in substantially parallel lines of flux 1432.

Thus, by employing anisotropic layers with lower resistance in the direction parallel to the contacting portions in the respective layers, resistors 1111 and 1112 are effectively eliminated from the model. In this way, measurements of the size of the mechanical interaction are significantly more accurate when mechanical interaction are closer to the edges of the device. This also ensures that relationship 310 holds true and in combination a substantially more reliable device is achieved.

What is claimed is:

1. A fabric-made position detector comprising:

a first fabric electrically conducting layer;

wherein said first electrically conducting layer has a first electrical contact and a second electrical contact and said second electrically conducting layer has a third electrically conducting contact and a fourth electrically conducting contact;

potential applying means (a) for applying potential across said first contact and said third contact while said second and fourth contacts are disconnected to produce a first current and (b) for applying a potential across said second contact and said fourth contact while said first and third contacts are disconnected to produce a second current;

current measuring means for measuring said first current to produce a first current value and for measuring said second current to produce a second current value; and processing means configured to produce a property value indicating a property of a mechanical interaction by processing said first current value in combination with said second current value.

2. A fabric-made position detector according to claim 1, wherein said first fabric electrically conducting layer and/or said second fabric electrically conducting layer have different conductivities in different directions.

3. A fabric-made position detector according to claim 2, wherein layer conductivity of said first layer in a first direction connecting said first contact with said second contact is lower than the conductivity in a second direction perpendicular to said first direction.

4. A fabric-made position detector according to claim 2, wherein said different conductivities are achieved by using different yarns having different conductivities.

5. A fabric-made position detector according to claim 2, wherein said different conductivities are achieved by using different mixtures of conducting and non-conducting yarn.

6. A fabric-made position detector according to claim 1, wherein said property value is determined as an average of said first current value and said second current value.

7. A fabric-made position detector according to claim 1, wherein said property value is determined by combining a reciprocal of said first current value with a reciprocal of said second current value.

8. A fabric-made position detector according to claim 1, wherein a central layer is disposed between said first fabric electrically conducting layer and said second fabric electrically conducting layer, said central layer including conducting means;

a first insulating separating means disposed between said first conductive layer and said conducting means; and a second insulating separating means disposed between said second conductive layer and said conducting means; wherein said conducting means provides a conductive path between said first conducting layer and said second conducting layer at the position of a mechanical interaction.

9. A fabric-made position detector according to claim 8, wherein said first insulating means comprises a first separate insulating layer and said second insulating means comprises a second separate insulating layer.

10. A fabric-made position detector according to claim 1, further including
- a compressible inner layer disposed between said first fabric conducting layer and said second fabric conducting layer having a plurality of conductive fibres or particles such that a conductive path is provided through said fibres or particles when said insulating material is placed in compression.

11. A method of detecting a mechanical interaction with respect to a position detecting device, wherein said position detecting device is configured to detect the position of a mechanical interaction by measuring electrical potentials applied across electrically conducting layers, characterised by the steps of
- measuring a first current when an electrical potential is applied between a first contact of a first conducting layer and a third contact of a second conducting layer while disconnecting connections to a second contact of the first conducting layer and a fourth contact of said second conducting layer;
- measuring a second current when an electrical potential is applied between said second and said fourth contacts while disconnecting connections to said first and said third contacts; and
- processing said first current measurement in combination with said second current measurement to derive an output indicative of a characteristic of said mechanical interaction.

12. A method of detecting mechanical interaction according to claim 11, wherein said first fabric electrically conducting layer and/or said second fabric electrically conducting layer have different conductivities in different directions.

13. A method according to claim 12, wherein layer conductivity of said first layer in a first direction connecting said first contact with said second contact is lower than conductivity in the second direction perpendicular to said first direction.

14. A method according to claim 12, wherein said different conductivities are achieved by using different yarns having different conductivities.

15. A method according to claim 12, wherein said different conductivities are achieved by using different mixtures of conducting and non-conducting yarn.

16. A method according to claim 11, wherein said property value is determined as an average of said first current value and said second current value.

17. A method according to claim 11, wherein said property value is determined by combining reciprocals of measured values.

18. A method of detecting a mechanical interaction according to claim 11, wherein
- a central layer is disposed between said first fabric electrically conducting layer and said second fabric electrically conducting layer, said central layer including conducting means;
- a first insulating separating means disposed between said first conductive layer and said conducting means; and
- a second insulating separating means disposed between said second conductive layer and said conducting means; wherein
  - said conducting means provides a conductive path between said first conducting layer and said second conducting layer at the position of a mechanical interaction.

19. A method according to claim 18, wherein said first insulating means comprises a first separate insulating layer and said second insulating means comprises a second separate insulating layer.

20. A method according to claim 11, further including a compressible inner layer disposed between said first fabric conducting layer and said second fabric conducting layer having a plurality of conductive fibres or particles such that a conductive path is provided through said fibres or particles when said insulating material is placed in compression.

* * * * *

UNITED STATES PATENT AND TRADEMARK OFFICE
CERTIFICATE OF CORRECTION

PATENT NO.   : 6,504,531 B1
DATED        : January 7, 2003
INVENTOR(S)  : Sandbach It is certified that error appears in the above-identified patent and that said Letters Patent is hereby corrected as shown below:

<u>Column 12,</u>
After line 10, insert -- a second fabric electrically conducting layer; --

Signed and Sealed this

Seventeenth Day of June, 2003

JAMES E. ROGAN
*Director of the United States Patent and Trademark Office*